United States Patent [19]
Wroblewski et al.

[11] Patent Number: 6,106,897
[45] Date of Patent: Aug. 22, 2000

[54] POLYMER PORE STRUCTURE

[75] Inventors: Paul Wroblewski, Syracuse, N.Y.; Frederick Doran, Lancashire, United Kingdom

[73] Assignee: Scapa Group Plc, Blackburn, United Kingdom

[21] Appl. No.: 09/094,602

[22] Filed: Jun. 15, 1998

Related U.S. Application Data

[63] Continuation-in-part of application No. 08/694,791, Aug. 9, 1996, abandoned.

[51] Int. Cl.⁷ .................................. B05D 1/00; B05D 5/00
[52] U.S. Cl. .......................... 427/209; 427/244; 427/246; 427/389.9
[58] Field of Search .................................. 427/389.9, 209, 427/244, 246

[56] References Cited

U.S. PATENT DOCUMENTS 3,860,680  1/1975  Warwicker et al. ....................... 264/41

FOREIGN PATENT DOCUMENTS

| 1012298 | 12/1965 | United Kingdom . |
| 1066480 | 4/1967 | United Kingdom . |
| 2155356 | 9/1985 | United Kingdom . |
| WO97/37745 | 10/1997 | WIPO . |

OTHER PUBLICATIONS

Derwent Information, Ltd., abstract of Japanese Patent Specification No. 60044012 (Mar. 1985).

*Primary Examiner*—Bernard Pianalto
*Attorney, Agent, or Firm*—Jacobson, Price, Holman & Stern, PLLC

[57] ABSTRACT

A method of manufacturing a polymer pore filter for filtering kaolin particles from an aqueous medium, comprising the steps of: coating and partially impregnating at least one face of a woven polyester textile substrate with a polyether based polyurethane polymer; coagulating the polymer by heating in the presence of a coagulant; and forming the polymer simultaneously with or immediately after coagulation.

14 Claims, No Drawings

POLYMER PORE STRUCTURE

This is a cip of Ser. No. 08/694,791 filed Aug. 9, 1996, abandoned.

The present invention relates to a polymer pore structure particularly for use in the filtration of particulate matter from aqueous media. The polymer pore structure of the invention has particular application in the filtration of kaolin.

It is known to filter kaolin particles from aqueous media utilising rotary drum filters.

A conventional rotary drum filter comprises a circular drum split into a plurality of separate axial sections spaced at predetermined intervals around the drum, each of which are connected to separate filtrate pipes. These pipes lead via the centre of the drum to one or both sides of the drum to a rotary vacuum valve and to liquid filtrate vacuum receivers.

Each section or panel is separated by means of caulking a groove or slot which may be of dovetail design. The filter cloth is fitted around the circumference of the drum as a full size cloth and caulked into one or more of the caulking grooves. Alternatively separate pieces of filter cloth may be fitted to cover one or more of the panels and caulked into the grooves and the complete drum covered in this manner.

The revolving drum is partially immersed in a trough filled with a slurry containing the particulate matter and an aqueous liquid. As the drum enters the suspension the liquid is drawn into the compartments by a vacuum and passed through the cloth into the compartment from where the liquid is conveyed by piping to the outside of the filter.

Solids retained by the cloth form a cake which is then washed by spraying with a liquid, such as water. Removal of the filtered solid cake is achieved by scraper blades known as doctor blades or by means of a doctor roller.

The filter cloth may also leave the drum for the discharge to be effected known as "Belt Discharge System" in which case the filter cloth is not caulked into any of the axial grooves.

Traditionally, fine particulate matter filtration and some grades of kaolin filtration have operated at about 2.0 to 6.0% efficiency, resulting in collection of 94 to 98% solid kaolin particles in liquid filtrate. This is considered to be quite poor retention efficiency.

In virtually all filtration applications, for example kaolin filtration, the principle is that the particles of solids are filtered or retained by the filter fabric on the surface and within the structure until a layer or thickness of particles is formed which then acts as the filter media retaining the remaining particles to be filtered during a prescribed cycle.

Particles of kaolin, $TiO_2$, magnetite and other fine particle matter, typically of particle size approximately 2 microns, when filtered with conventional fabrics are filtered with a proportion of the particles passing through the fabric and escaping capture.

An object of the present invention is to replace the conventional filter cloth with a filter medium which retains the initial layer of solids, thus resulting in an increase of retention efficiency.

It has surprisingly been found that use of a particular coated fabric can improve filtration efficiency of kaolin particles in aqueous media by many orders of magnitude. It is therefore an object of the present invention to provide a coated fabric which maximises the efficiency of kaolin filtration.

According to the present invention, there is proposed a method of filtering kaolin particles from an aqueous medium using a polymer pore filter, said filter comprising a textile substrate and a coagulated polymer, said polymer coating and at least partially impregnating said textile substrate.

The invention also provides a method of manufacturing a polymer pore filter for filtering kaolin particles from an aqueous medium, wherein the polymer pore filter is manufactured by a procedure comprising the steps of coating and at least partially impregnating a textile substrate with a polymer, heating the substrate, and then coagulating the polymer.

The polymer pore structure of the present invention has surprisingly been found to improve filtration collection to 99.97% of solids, resulting in kaolin filtration being operated at 0.03% efficiency as compared to 2 to 6% efficiency of previous traditional methods.

The pore structure may be applied to one or both sides or the internal structure of all types of textile fabrics, woven and non-woven.

Preferably the polymer coating of the phase separation fabric comprises a polyether based polyurethane coating. The polymer may also be derived from polyester, polyether ketone, caprolactam or carbonate.

The substrate, which acts as a support fabric for the polymer pore structure, is chosen to be compatible with the pore structure and the chemical conditions of the filtration application.

Preferably the substrate is a woven polyester fabric.

The substrate may comprise a 2/8 PET staple warp, i.e., two intertwined yarns containing eight filaments each, woven in a 2/1 twill weave at 23 to 75 ends per cm with 1/4 PET staple weft, i.e., a single yarn containing four filaments at 9 picks per cm. Such a substrate gives a fabric with a unit weight of approximately 440 $g/m^2$.

The substrate may be composed of a needle felt i.e., batt on base. It may be chosen from woven fabrics, laminates and combinations of woven and non-woven layers.

It is preferable that a suitable substrate be chosen which allows surface filtration as well as depth filtration, wherein the internal media acts as a phase separation region.

With conventional filter cloths the fabric tends to "blind" which is the build up of particulate matter within the structure of the fabric. These particles remain within the fabric when the cake is removed, this results in the capacity of the filter cloth to pass filtrate being reduced and production rates are consequently not maintained.

The polymer pore structure prevents the build up of a particulate matter within the support fabric and consequently production rates have been found to be maintained.

The substrate may be coated on both sides. Preferably, it is coated on one side only with a polymer coating.

The final coating is sufficiently thick to cover at least one side of the substrate support, preferably at a range of thickness of approximately 0.1–1.0 mm, preferably 0.3–0.8 mm, further preferably at a thickness of 0.5 mm. The total fabric thickness may be from 1.5–2.4 mm.

Preferably, the pore size of the phase separation fabric is approximately 3 to 10 microns and further preferably, approximately 4–5 microns.

Fabric permeability may be up to 2–10 L DIN (according to DIN 53887). It is preferable that the surface of the phase separation fabric be very smooth for good filter cake release properties.

Coagulation of the polymer coating may be carried out in DMF using a 10 to 20% solids solution.

The coagulated polymer is preferably foamed, with an open cell foam structure, said foaming occurring simultaneously with or immediately after the coagulation. Foaming may be achieved either by physical means or by using a chemical foaming agent. The foaming agent preferably comprises a low boiling water insoluble halogenated hydrocarbon. The halogenated hydrocarbon preferably has a boiling point in the range from 10° C. to 50° C. and more preferably in the range from 20° C. to 30° C. Preferred foaming agents include 1,2-dibromo-1,1,2,2,-tetrafluoroethane and trichlorofluoroethane.

The foaming and/or the coagulation of the polymer may be achieved by heating the impregnated coated textile substrate, preferably in the presence of a heat coagulant. Suitable heat coagulants include vinyl alkyl ether and derivatives thereof, polyacetals, polythio ethers, poly (ethylene oxide) and derivatives thereof, and poly (propylene/ethylene oxide) and derivatives thereof. The heat coagulant may be built into the backbone of the polymer. Usually heating to a temperature of about 70° C. results solely in coagulation. Heating above this temperature will generally also result in foaming provided a foaming agent is present.

Coagulation may also be achieved by means of adding a suitable electrolyte and/or varying the pH of the polymer latex. For example, with cationic polymers coagulation may occur at an alkaline pH and for anionic polymers coagulation occurs at an acid pH. This may be followed by heating to achieve satisfactory foaming.

The coating may be applied by any coating technique such as knife coating, dip coating, lick coating, screen printing or spraying. Reverse roller techniques may be employed.

The retained particles are of approximately 2 microns and above in size, and the filter cloth can be used to retain materials such as kaolin or china clay, titania and magnetite for example. Other materials which can be retained include dyestuffs, and other iron oxides and pigments.

In a preferred example of the invention, a filtration material is used which comprises a 1 mm thick substrate woven from PET staple yarns on a 2/1 twill weave pattern, which is provided with a 300 μm coating of ether-based polyurethane, coagulated on at least one face of the substrate.

This material is used for wet filtration of kaolin. The substrate is impregnated as completely as possible with the coagulated polyurethane, with a further thin level surface layer which enhances release characteristics. This avoids the prominent coating typically associated with mechanically blown coated structures which are vulnerable in aggressive conditions.

For this example, the following parameters were measured:

TABLE

| | |
|---|---|
| Mean Flow Pore Pressure | 1.361 psi |
| Mean Flow Pore Diameter | 4.8784 μm |
| Bubble Point Pressure | 0.620 psi |
| Bubble Point Pore Diameter | 10.7171 μm |

Pore sizes were overwhelmingly in the range 4.6–6.0 μm in diameter with only an insignificant number larger or smaller.

What is claimed is:

1. A method of manufacturing a polymer pore filter for filtering kaolin particles from an aqueous medium, comprising the steps of:

(a) coating and at least partially impregnating at least one face of a woven polyester textile substrate with a polyether based polyurethane polymer;

(b) coagulating the polymer by heating in the presence of a heat coagulant; and (c) foaming the polymer simultaneously with or immediately after coagulation.

2. The method according to claim 1, wherein the heat coagulant is vinyl alkyl ethers or derivatives thereof polyacetals, polythio ethers, poly(ethylene oxide) or derivatives thereof or poly(propylene/ethylene oxide) or derivatives thereof.

3. The method according to claim 1, wherein the heat coagulant is present in the backbone of the polymer.

4. The method according to claim 1, wherein foaming is achieved by using a chemical foaming agent.

5. The method according to claim 4, wherein the chemical foaming agent is a low boiling, water insoluble, halogenated hydrocarbon.

6. The method according to claim 5, wherein the chemical foaming agent has a boiling point in the range from 10° C. to 50° C.

7. The method according to claim 4, wherein the chemical foaming agent is 1,2-dibromo-1,1,2,2-tetrafluoroethane or trichlorofluoroethane.

8. The method according to claim 1, wherein the polymer is applied to both faces of the textile.

9. The method according to claim 1, wherein the polymer impregnates the internal structure of the textile substrate to a thickness of approximately 0.1–1.0 mm.

10. The method according to claim 1, wherein the polymer impregnates the internal structure of the textile substrate to a thickness of approximately 0.3–0.8 mm.

11. The method according to claim 1, wherein the polymer pore filter has a pore size of approximately 5–10 microns.

12. The method according to claim 1, wherein the polymer pore filter has a pore size of approximately 5 microns.

13. The method according to claim 1, wherein the permeability of the polymer pore filter is up to approximately 12 cfm.

14. The method according to claim 1, wherein the permeability of the polymer pore filter is approximately 0.2–3.5 cfm.

* * * * *